UNITED STATES PATENT OFFICE.

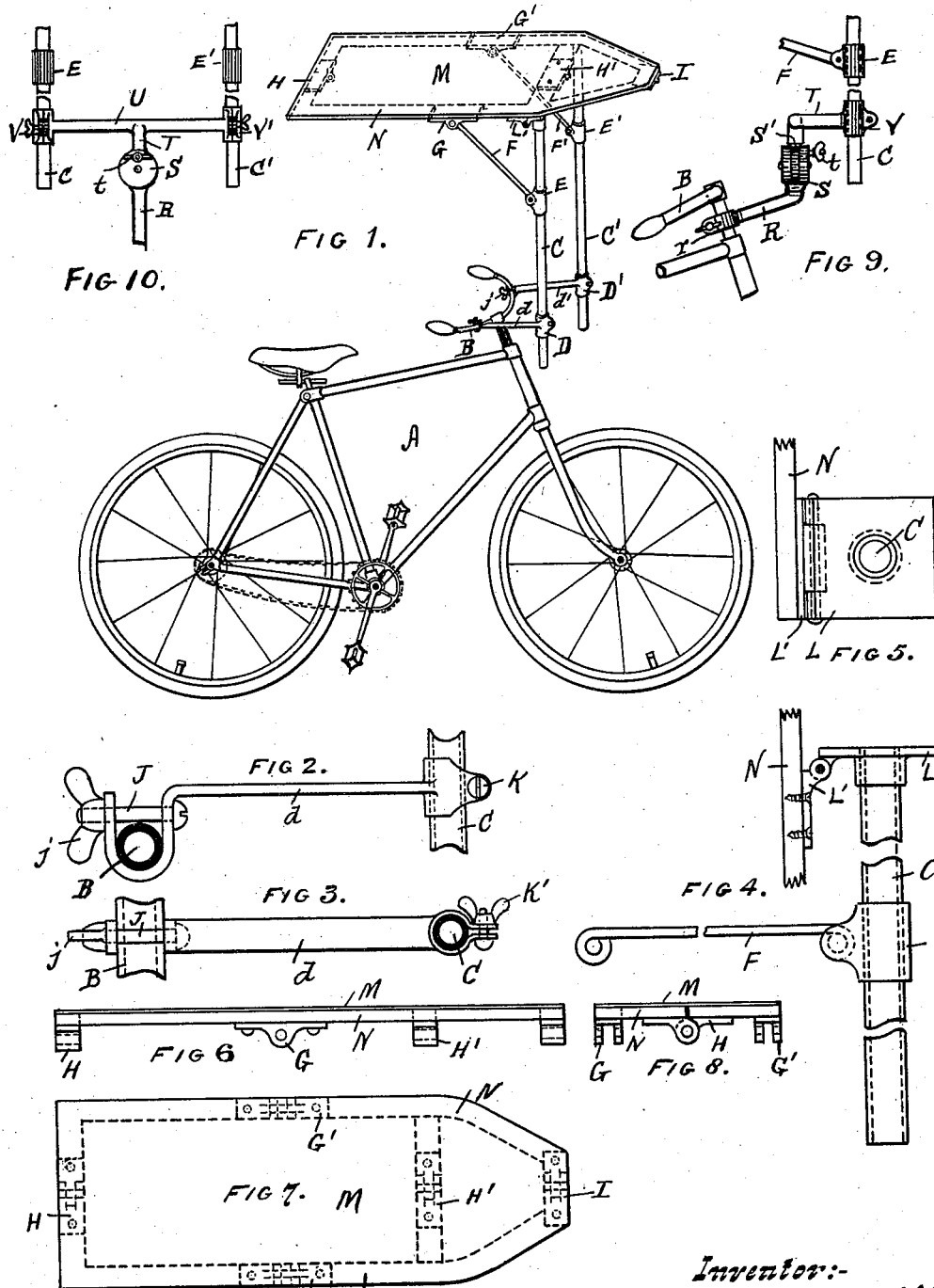

ALICE A. BENNITT, OF ELGIN, ILLINOIS.

BICYCLE-CANOPY.

SPECIFICATION forming part of Letters Patent No. 574,235, dated December 29, 1896.

Application filed March 6, 1896. Serial No. 582,134. (No model.)

*To all whom it may concern:*

Be it known that I, ALICE A. BENNITT, a citizen of the United States, residing at Elgin, in the county of Kane and State of Illinois, have invented certain new and useful Improvements in Bicycle-Canopies; and I do declare the following to be a full, clear, and exact description of the invention, such as will enable others skilled in the art to which it appertains to make and use the same, reference being had to the accompanying drawings, and to letters of reference marked thereon, which form a part of this specification.

My invention relates to that class of canopies or sunshades which are adapted for use on bicycles and like vehicles; and it consists of a canopy and supports of peculiar construction which may be readily adjusted to shade either side of a rider and which may be readily detached from a bicycle or attached thereto, as more fully described and claimed hereinafter.

My object is to provide a canopy and supports that may be readily attached to a bicycle or detached and folded compactly for storage when not in use, simple in design, and cheaply manufactured. These objects are attained in my invention, which is, furthermore, light in weight and easily manipulated.

Referring to the drawings, Figure 1 represents a perspective view of my devices attached to a bicycle; Fig. 2, a transverse section of a portion of a handle-bar with clamp-arm attached; Fig. 3, a plan view of Fig. 2, with standard in section; Fig. 4, a side elevation of a standard and connections broken; Fig. 5, a plan of hinge-cap for standards; Fig. 6, a side view of canopy-frame; Fig. 7, a top plan of canopy; Fig. 8, an end view of canopy-frame; Fig. 9, a side view of my adjustable bracket and attached portions of standard, and Fig. 10 a front view of Fig. 9.

In the drawings, A represents a bicycle; B, the handle-bar of same; C C', the canopy-standards; d d', non-adjustable supporting-arms; R, adjustable bracket carrying bar U, which supports the standards, and M is the canopy.

In constructing my invention I use such material as will correspond in cost to the class of bicycle on which it is used or to suit the fancy of the user, as may be desired. Preferably the brackets, arms, standards, frame, and braces are made of aluminium or an alloy of the same and the canopy of gossamer or similar material, but the standards and frame may be made of willow or other light wood.

The frame N is suitably covered with any desired flexible material M and is provided with suitable hinges H H' I, permitting it to be closed, the under side inward. The standards C C' are preferably cylindrical and smooth. At the top of each is secured a cap-plate L, preferably having a socket fitting over the top of standard, but in some cases it may have a shank fitting into a tubular standard. One side of this cap-plate is provided with one part of a hinge, to which is pivoted a part of hinge L' to correspond thereto. To the part L' is secured the frame-piece N, so that the canopy may be dropped down against the standards.

E E' are spring-clamps adapted to slide over the standards, and are provided with suitable binding-screws, by which are pivoted the angle-braces F F', having their opposite ends pivoted to a bracket or cleat G or G', attached to the under side of the frame N.

The supporting-arms d d' are provided at one end with a suitable clamp, embracing the handle-bar B, and a bolt J, having a thumb-nut j, which form a powerful clamp to secure the arm, the strain on this, however, not being very great, as it is observed that the canopy overhangs back of the point of support, approximately balancing the weight. The opposite end of each arm has a spring-clamp D or D', embracing the lower part of the standards, which is adjustable therein vertically. These clamps have a bolt K and thumb-nut K' for binding the standard. When not in use, the arms d d' may be detached from the handle-bar and each turned toward the opposite standard, and the clamps E E' loosened and slipped downward, bringing the canopy down against the standards. Then by means of the hinges on the canopy-frame it may be folded so that the standards are inclosed between the two halves. In some cases I may, however, dispense with the latter folding hinges, as without this fold it is still quite compact.

In constructing my supports to provide that the canopy be capable of adjustment sidewise to protect the rider from the angular rays of a morning or evening sun I employ the supporting devices conforming substantially to that shown in Figs. 9 and 10, in which the bracket R, by means of its clamp $r$ and a binding-screw, is secured to the front post of the bicycle, or it may be attached to the head below. The opposite end of the bracket is provided with a radial clamp standing vertically, comprising, preferably, the jaws S, between which is a circular blade S', and a pivotal rivet through the center. The tightening of the set-screw $t$, situated above the center, effectually binds the parts and secures the canopy at any angle to which it may be tilted. The blade S' and bracket T are integral, the latter joining a cross-arm U centrally, at each end of which is a spring-clamp V and V', provided with suitable binding-screws, the clamps embracing and supporting the standards C C'. The application and use of my canopy will thus be readily understood, and its advantages are obvious.

Having described my invention, what I claim as new, and desire to secure by Letters Patent, is—

1. In a bicycle-canopy, the combination with a suitably-covered frame; of the standard C C' suitably supported; the cap-plates L secured to the upper ends of said standards and having the parts L' hinged thereto and secured to said frame by means of which the latter may be folded down against said standards; the brackets G G' attached to the under side of said frame; the angle-braces F F' pivotally attached at one end to said brackets; the spring-clamps E E' pivotally attached to the opposite ends of said braces and slidable on said standards, said clamps having suitable binding-screws whereby they may be secured adjustably, substantially as shown and described.

2. In a bicycle-canopy, the combination of the frame, the standards, the hinged cap and angle-braces adjustably connecting said frame and standards; the bracket R having the spring-clamp $r$ adapted to be attached to a bicycle, said bracket comprising an arm turned upward and provided with jaws S having a set-screw $t$, a circular blade S' centrally pivoted in the jaws, the part T formed integrally with the blade, the cross-arm U formed integrally with the part T, and the spring-clamps V V' rigid at the ends of the cross-arm said clamps supporting the said standards, substantially as shown and described.

In testimony whereof I affix my signature in presence of two witnesses.

ALICE A. BENNITT.

Witnesses:
J. H. WILLIAMS,
H. L. GIVEN.